No. 722,723. PATENTED MAR. 17, 1903.
F. LAMPLOUGH.
STEERING GEAR FOR MOTOR VEHICLES.
APPLICATION FILED APR. 16, 1902.
NO MODEL. 4 SHEETS—SHEET 1.
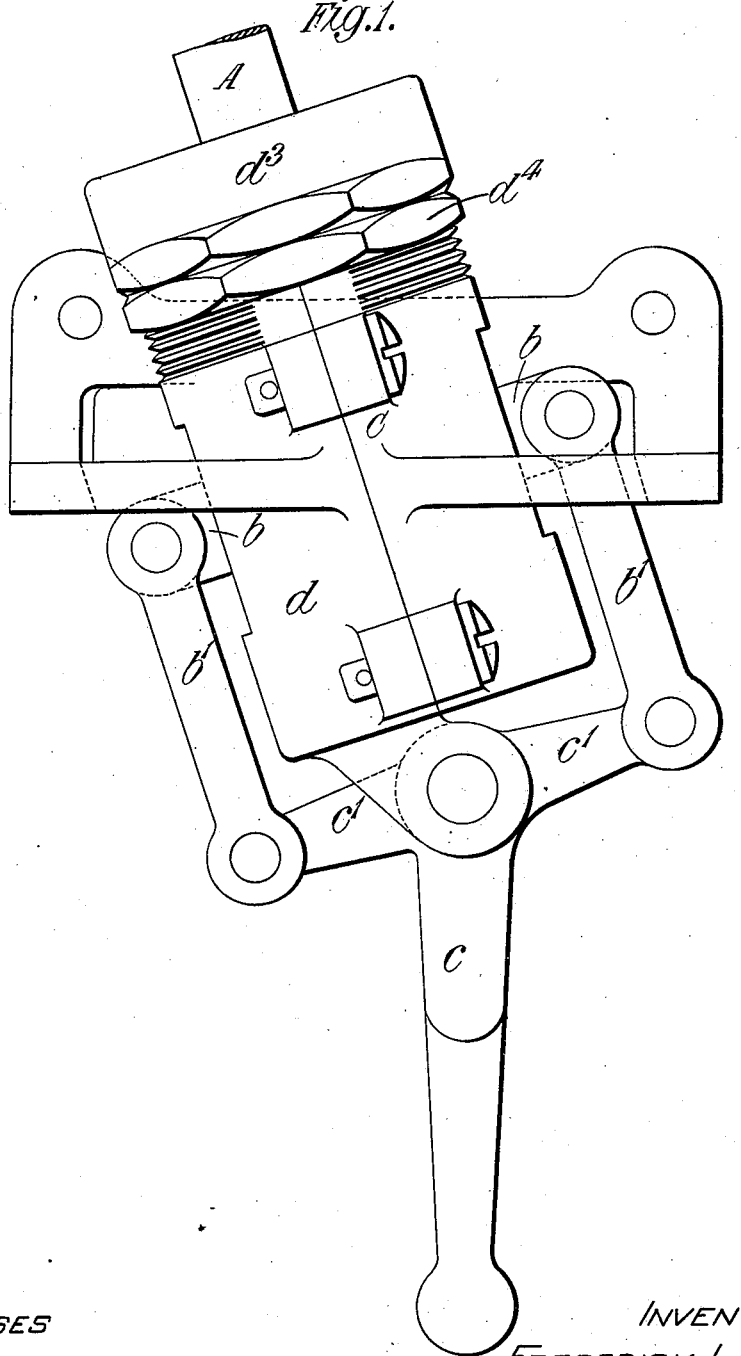
WITNESSES
INVENTOR
FREDERICK LAMPLOUGH
BY HIS ATTY

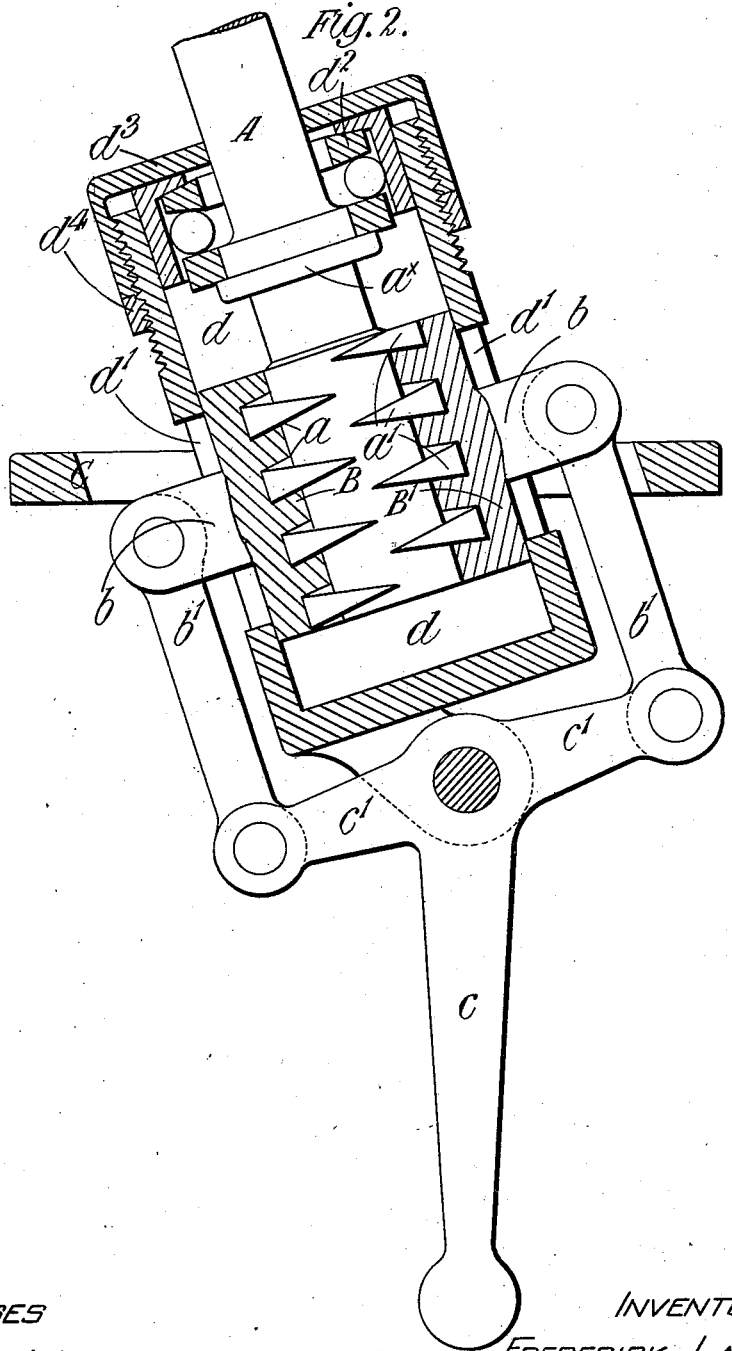

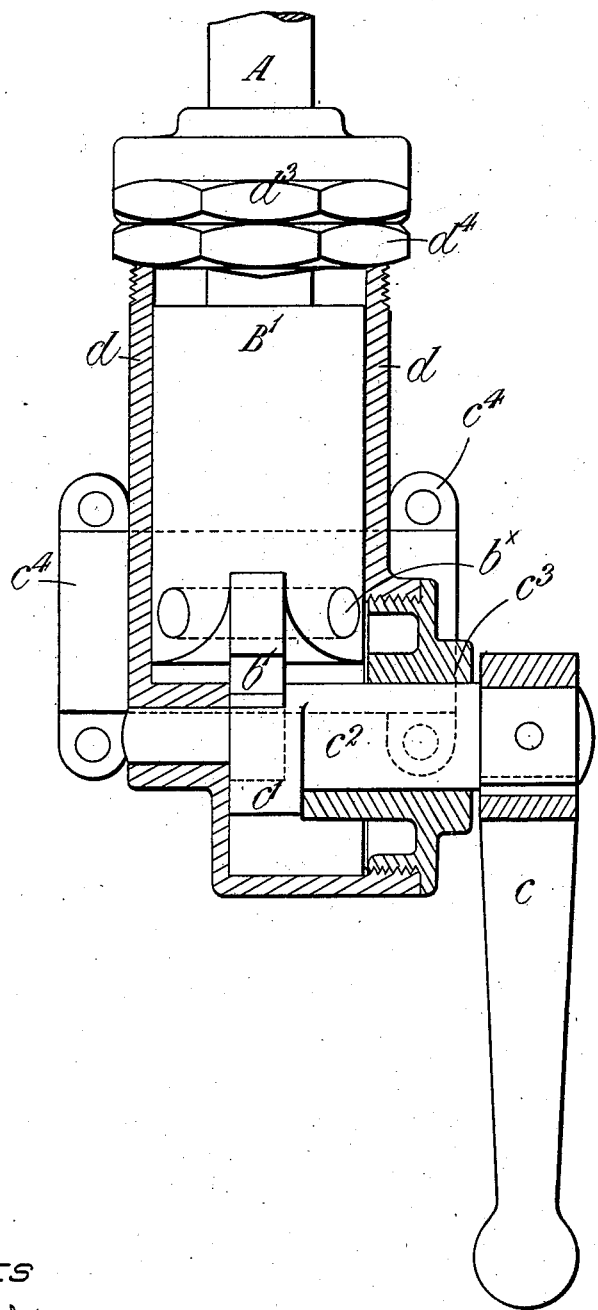

No. 722,723. PATENTED MAR. 17, 1903.
F. LAMPLOUGH.
STEERING GEAR FOR MOTOR VEHICLES.
APPLICATION FILED APR. 16, 1902.
NO MODEL. 4 SHEETS—SHEET 4.
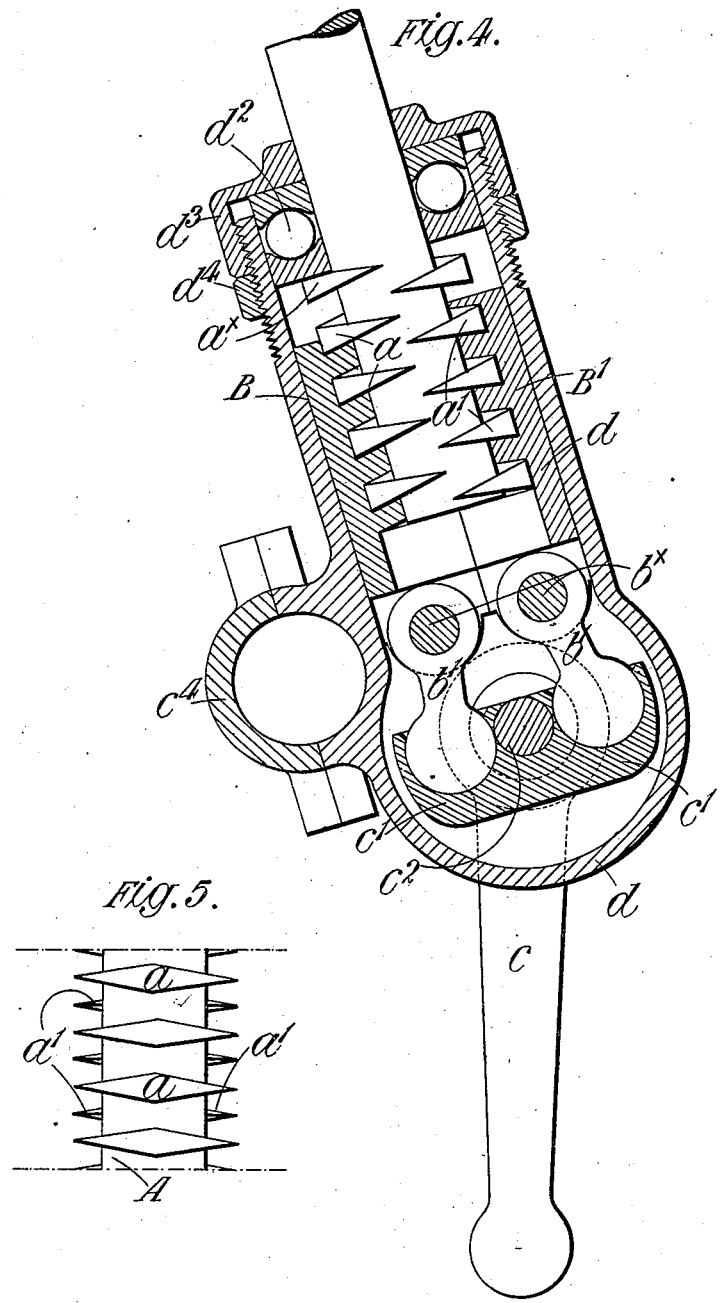
INVENTOR
FREDERICK LAMPLOUGH
BY HIS ATTY. Edward S. Beach
WITNESSES
M. E. Coveney
E. A. Allen

UNITED STATES PATENT OFFICE.

FREDERICK LAMPLOUGH, OF WILLESDEN, LONDON, ENGLAND.

STEERING-GEAR FOR MOTOR-VEHICLES.

SPECIFICATION forming part of Letters Patent No. 722,723, dated March 17, 1903.

Application filed April 16, 1902. Serial No. 103,106. (No model.)

*To all whom it may concern:*

Be it known that I, FREDERICK LAMPLOUGH, engineer, a subject of the King of Great Britain, residing at 6 Scrubbs Lane, Cumberland Park, Willesden, in the county of London, England, have invented certain new and useful Improvements in the Steering-Gear of Motor-Driven Vehicles, of which the following is a specification.

My invention relates to the steering-gear of motor-driven vehicles, and has for its chief objects to simplify the construction and cheapen the cost of such gear, to provide means for compensating for wear of the parts, and to provide for the self-locking of the parts in any position to which they may be set by the actuating wheel or handle.

According to my said invention I provide the shaft or spindle that carries the actuating wheel or handle with right and left handed screw-threads and with a divided nut having one portion or member for each of the aforesaid screw-threads, so that when the said shaft or spindle is rotated the said members or portions are caused to travel longitudinally in opposite directions to each other and to thereby actuate the steering wheel or wheels of the vehicle through suitable means connecting said members of the divided nut with the steering wheels or wheels.

In order that my said invention may be clearly understood and readily carried into effect, I will proceed to describe the same more fully with reference to the accompanying drawings, in which—

Figure 1 is an elevation, and Fig. 2 a vertical section, of steering-gear constructed according to my invention. Fig. 3 is a sectional elevation, and Fig. 4 a vertical section in a plane at right angles to Fig. 3, of a modified form of the gear intended for use with a heavy motor-vehicle. Fig. 5 is an elevation of the lower part of the actuating-spindle shown in Fig. 4 detached and as seen from the left of Fig. 4.

A is the actuating-spindle, which, as is usual with motor-driven vehicles, occupies an inclined position to the vertical, so as to be conveniently operated by the driver of the vehicle. This spindle is formed with cross-cut or diamond screw-threads $a\ a'$, which constitute the aforesaid right and left handed screw-threads. B B' are the two portions or halves into which the nut that engages with said threads is divided. The said nut is provided with two lugs or projections $b\ b$, which are connected, through the intervention of links $b'\ b'$, with rocking arms $c\ c'$, forming part of or connected with a lever $c$. The said lever is disposed at such an angle to the arms $c'\ c'$ that it will (when the gear is secured in place on the vehicle by means of the bracket C) assume a vertical position. The aforesaid spindle and divided nut are arranged in a casing or housing $d$, in which the divided portions are adapted to freely slide, their lugs $b\ b$ (in Figs. 1 and 2) projecting through and sliding in slots or apertures $d'\ d'$, formed in the walls of said casing. The said casing has a ball-bearing $d^2$ for the spindle A. The lower ball-race of said bearing is supported by a collar or projection $a^\times$ on the spindle, and the upper end of the casing is closed by a screw-cap $d^3$. The extent to which said cap can be screwed upon the casing is limited by means of a nut $d^4$. By adjusting the position of this nut the spindle A and its divided nut B B' can be shifted longitudinally by turning the screw-cap $d^3$ for the purpose of tightening up the various parts of the gear and compensating for the wearing of the parts.

In Figs. 3 and 4 the lugs $b\ b$ on the divided nut and the slots or apertures $d'\ d'$ in the casing are dispensed with, and the lower portion of the said casing is adapted to inclose the links $b'\ b'$, employed for connecting the two portions of the divided nut with the rocking arms $c'$, which in this example are carried by an axle $c^2$. This axle is arranged horizontally and is maintained in place by a screw-collar $c^3$, whose inner end lies in close contiguity to the rocking arms $c'\ c'$, with which said axle is formed. These arms are recessed to receive the lower curved ends of the links $b'\ b'$, whose upper ends are pivotally connected with the divided nut by pins $b^\times\ b^\times$. $c^4\ c^4$ are sockets by means of which the gear is secured in place on the vehicle.

What I claim, and desire to secure by Letters Patent of the United States, is—

1. In steering-gear, the combination with a right and left hand screw-threaded spindle, a divided nut and means for transmitting the movement of the nut to the steering wheel or wheels; of a casing inclosing said divided nut, and of means for adjusting the position of the spindle and nut in said casing, for the purpose specified.

2. In steering-gear, the combination with a right and left hand screw-threaded spindle, a divided nut and means for transmitting the movement of the nut to the steering wheel or wheels; of a casing inclosing the threaded portion of the spindle and the divided nut, of a bearing in said casing for the spindle, and of means for adjusting the position of the bearing in said casing, substantially as and for the purpose specified.

3. In steering-gear, the combination with a right and left hand screw-threaded spindle, and a divided nut, of a casing inclosing the threaded portion of the spindle and the nut, of means for adjusting the position of the spindle and nut in said casing, of links connecting the portions of the divided nut to rocking arms, and of means for transmitting the movements of the rocking arms to the steering wheel or wheels substantially as and for the purpose specified.

4. In steering-gear, the combination with a right and left hand screw-threaded spindle and a divided nut, of a casing inclosing the threaded portion of the spindle and the nut, of a ball-bearing in said casing for the spindle, of a projection on said spindle for supporting the ball-bearing, of a screw-cap on said casing adapted to keep said bearing pressed against the projection, of means for limiting the extent to which said screw-cap can be turned, of links connecting the portions of the divided nut to rocking arms, and of means for transmitting the movements of the rocking arms to the steering wheel or wheels substantially as and for the purpose specified.

5. In steering-gear, the combination with a right and left hand screw-threaded spindle and a divided nut, of a casing inclosing the threaded portion of the spindle and the nut, of a ball-bearing in said casing for the spindle, of a projection on said spindle for supporting said bearing, of a screw-cap on said casing adapted to keep said bearing pressed against the projection, of a nut for limiting the extent to which said screw-cap can be turned, of links connecting the portions of the divided nut to rocking arms, of another arm connected with said rocking arms and adapted to transmit the movement of the latter to the steering wheel or wheels, and of means of securing the gear in place on the vehicle substantially as and for the purpose specified.

In testimony whereof I have hereunto set my hand, in presence of two subscribing witnesses, this 21st day of November, 1901.

FREDERICK LAMPLOUGH.

Witnesses:
THOS. C. WARDLE,
WALTER J. SKERTEN.